No. 777,731. PATENTED DEC. 20, 1904.
L. M. JONES, C. McLEOD & W. G. HUNT.
SWATH BOARD FOR MOWER DIVIDER SHOES.
APPLICATION FILED JUNE 18, 1902.
NO MODEL.
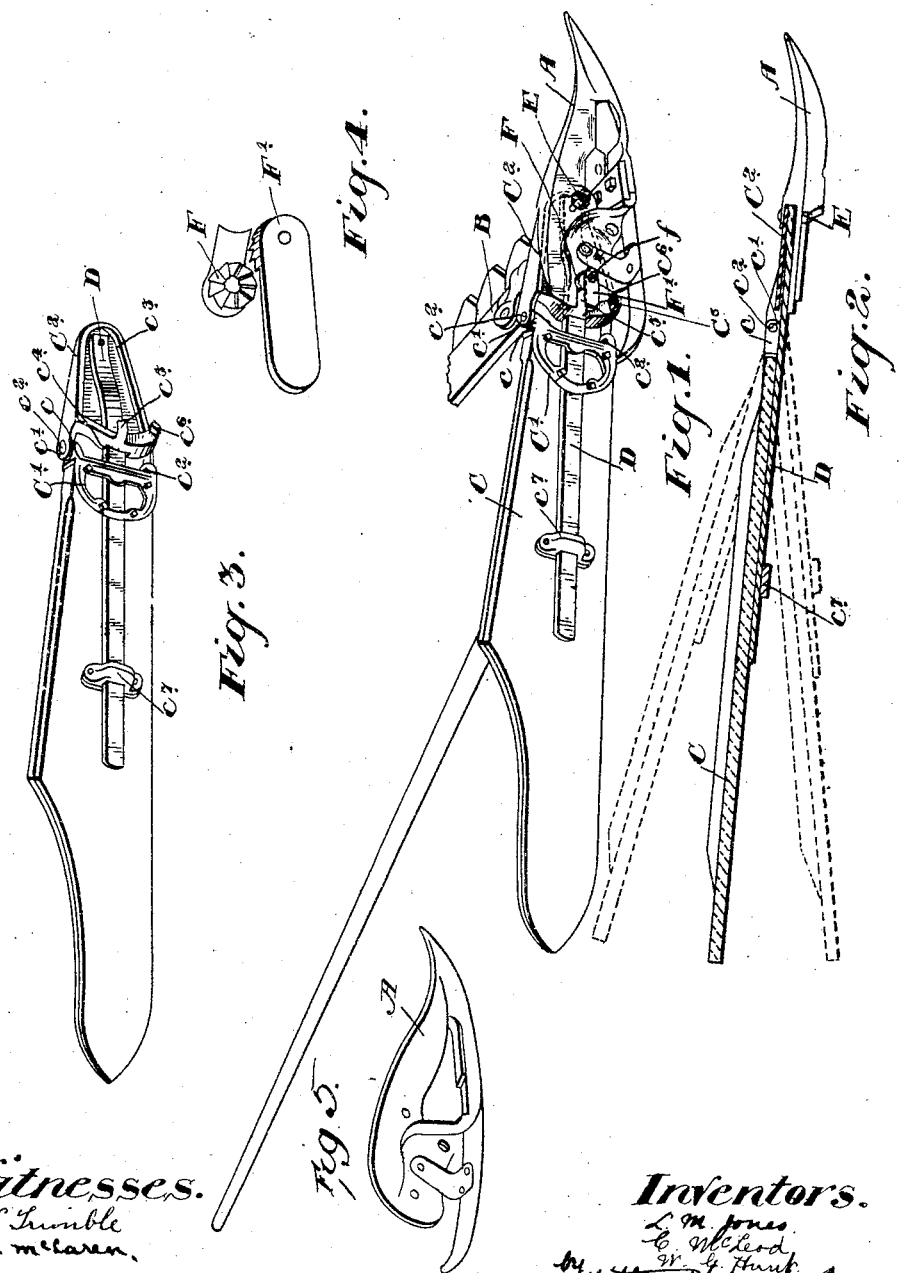
Witnesses.
Inventors.

No. 777,731.

Patented December 20, 1904.

UNITED STATES PATENT OFFICE.

LYMAN MELVIN JONES AND CHARLES McLEOD, OF TORONTO, AND WILLIAM GEORGE HUNT, OF MONTREAL, CANADA, ASSIGNORS TO MASSEY-HARRIS COMPANY, LIMITED, OF TORONTO, CANADA, A CORPORATION.

SWATH-BOARD FOR MOWER DIVIDER-SHOES.

SPECIFICATION forming part of Letters Patent No. 777,731, dated December 20, 1904.

Application filed June 18, 1902. Serial No. 112,185.

*To all whom it may concern:*

Be it known that we, LYMAN MELVIN JONES, manufacturer, and CHARLES McLEOD, manufacturer, both of the city of Toronto, in the county of York, in the Province of Ontario, and WILLIAM GEORGE HUNT, bookkeeper, of the city of Montreal, in the county of Hochelaga, in the Province of Quebec, Canada, have invented certain new and useful Improvements in Swath-Boards for Mower Divider-Shoes, of which the following is a specification.

Our invention relates to improvements in swath-boards for mower divider-shoes; and the object of the invention is to produce a swath-board which will yield to obstructions on the surface of the ground, and consequently not be liable to be broken; and it consists, essentially, of a swath-board preferably pivotally connected to the rear of the divider-shoe and provided with a spring whereby it may swing at the rear inwardly and outwardly in order to pass an obstruction, the parts being otherwise constructed and arranged in detail as hereinafter more particularly explained.

Figure 1 is a perspective view of a swath-board divider-shoe of a mower and portion of a cutter-bar as made in accordance with our invention. Fig. 2 is a sectional plan. Fig. 3 is a perspective detail of the swath-board, showing the location of spring and formation of the front portion thereof. Fig. 4 is a perspective detail of the adjustable device whereby the swath-board may be raised and lowered at the rear and secured in position. Fig. 5 is a view of the shoe detached from the swath-board.

In the drawings like letters of reference indicate corresponding parts in each figure.

A is the divider-shoe, which is secured in the usual manner or in any suitable manner at the outer end of the cutter-bar B of the mower.

C is the swath-board, which is made for the most part of wood. The front end, however, is preferably made of metal, such as malleable iron, in two portions—viz., the straddle-plate C', secured to the front end of the wooden portion and provided with forwardly-extending lugs $c$ and the swing-plate $C^2$, which is pivotally connected at the rear, at the top, and bottom by means of the lugs $c'$ and bolts $c^2$ passing through them and the lugs $c$ to the straddle-plate C'. The swing-plate $C^2$ has a reinforcing ribbed edge $c^3$, the rear portion of which is provided with a slot $c^4$ and limiting projecting lugs $c^5$ and $c^6$ for a purpose which will hereinafter appear. The swing-plate $C^2$ has extending into the forward portion thereof preferably a flat spring D, which is slightly bent at the front and is provided with a hole, through which hole and a hole in the swing-plate and also a hole in the shoe a bolt E is passed, as indicated by full and dotted lines in Fig. 1, and thus it will be seen the forward end of the swath-board is pivotally held in place upon the bolt E, so that it may be swung upwardly or downwardly at the rear. The spring D extends rearwardly through the slot $c^4$ and under the straddle-plate C' and through the straddle-bracket $c^7$, which is secured to the wooden portion of the swath-board intermediate of the length of such board, as indicated.

In order to secure the swath-board at any desired height, it is necessary to provide for the limited movement or swing of the rear end of the swath-board upon the bolt E, and for this purpose we provide a face toothed ratchet F, which is secured to or forms part of the divider-shoe and is designed to coact with the face toothed ratchet formed on the inner end and side of the arm F', the inner end of which extends into a position between the lugs $c^5$ and $c^6$. The face-ratchet on the inside of the arm F' is secured to the face-ratchet F by means of a central bolt $f$. It will thus be seen that by unloosening the central bolt, the position of the arm F' may be adjusted to any desired height and then tightened, and the swath-board may thus be correspondingly swung and will necessarily be supported upon such arm F' by means of the lugs $c^5$ resting thereon. As an equivalent form of construction we may make the arm rigid and provide a pin or bolt in the end thereof, which may be projected into one or the other of the holes in the rear rib between the lugs $c^5$ and $c^6$.

The utility of our invention will be readily understood.

It is well known by those skilled in the art that swath-boards have heretofore been broken by reason of their being inclined inwardly, and thereby should they meet an obstruction not being able to recede from such obstruction. By our invention, however, it will be seen that the swath-board may readily recede from the dotted position shown in Fig. 2, which would be the normal position, to a position directly at right angles to the cutter-bar, and thereby allow the board freely to pass any obstructions as the machine is being driven forward, and not only this, but even the swath-board may under similar circumstances be bent backwardly into the position shown in dotted lines to the outside of the full-lined position, so that no matter what the nature of the obstruction the free passage of the swath-board past it is assured without any liability of such swath-board being deleteriously affected.

What we claim as our invention is—

1. In a mower, the combination with the divider-shoe, of a swath-board made in two portions consisting of a front portion suitably connected to the divider-shoe and a rear portion pivotally connected to the front portion in such a manner that it may be swung or forced laterally from the normal position and a flat spring extending forwardly at one side of the front portion and suitably confined or connected to the front portion and extending rearwardly to one side of the rear portion and suitably connected to the same as and for the purpose specified.

2. In a mower, the combination with the divider-shoe, of the forward portion of the swath-board extending to one side of the divider-shoe and provided with rear lugs, a pivotal bolt extending through the front portion of the same and the divider-shoe, the rear portion of the swath-board being provided with lugs and pivotal bolts extending through the lugs in such rear portion and the lugs in the front portion and a flat spring held in position at the front portion by the front laterally-extending pivotal bolt and suitably connected to the side of the rear portion of the swath-board as and for the purpose specified.

3. The combination with the divider-shoe, of the front portion of the swath-board provided with a reinforcing edge and a rear slot and rear lugs and the rear portion of the swath-board provided with a straddle-plate having front lugs, pivotal bolts connecting the lugs of the front portion to the lugs of the rear portion, a spring suitably confined and held to the front portion and extending through a slot in the rear reinforcing-rib and under the straddle-plate in the rear portion alongside of such rear portion and a confining bracket for the rear portion of the flat spring as and for the purpose specified.

4. The combination with the divider-shoe, of the swath-board pivotally swung at the front on a laterally-extending bolt extending through the divider-shoe and limiting-lugs formed on the swath-board and an arm secured to the divider-shoe whereby a limited movement or vertical throw may be given to the swath-board as and for the purpose specified.

5. The combination with the divider-shoe, of the swath-board pivotally swung at the front at the side of the divider-shoe, a face-ratchet attached to or forming part of the divider-shoe, an arm provided with a face-ratchet engaging with the aforesaid ratchet, a bolt connecting the ratchets together and limiting-lugs secured on the swath-board whereby the swath-board may be permitted to be swung and held in any desired definite position within certain limits as and for the purpose specified.

6. In a mower, the combination with the divider-shoe, of a swath-board connected at the front to the divider-shoe, and an elongated spring so connected to the divider-shoe and swath-board as to give a definite set to the swath-board when the spring is at rest, whereby the swath-board may yield laterally inwardly or outwardly, said spring lying alongside of the divider-shoe and swath-board as specified.

7. In a mower, the combination with the divider-shoe, of a swath-board connected at the front to the divider-shoe, and a spring lying alongside of the divider-shoe and swath-board and connected at the front to the divider-shoe and at the rear to the swath-board, such spring being arranged to be at rest when the swath-board is in its normal position, whereby the swath-board may yield laterally inwardly or outwardly as specified.

LYMAN MELVIN JONES.
CHARLES McLEOD.
WILLIAM GEORGE HUNT.

Witnesses to the signatures of Lyman Melvin Jones and Charles McLeod:
G. A. WHITAKER,
THOS. FINDLEY.

Witnesses to the signature of William George Hunt:
LLOYD BLACKMORE,
ROBERT TROTTER.